United States Patent
Care et al.

(10) Patent No.: US 6,485,255 B1
(45) Date of Patent: Nov. 26, 2002

(54) COOLING AIR FLOW CONTROL DEVICE FOR A GAS TURBINE ENGINE

(75) Inventors: Ian C D Care, Derby (GB); Roger Ashmead, Derby (GB)

(73) Assignee: Rolls-Royce plc, London (GB)

( * ) Notice: Subject to any disclaimer, the term of this patent is extended or adjusted under 35 U.S.C. 154(b) by 51 days.

(21) Appl. No.: 09/662,009

(22) Filed: Sep. 14, 2000

(30) Foreign Application Priority Data

Sep. 18, 1999 (GB) .............................................. 9922044

(51) Int. Cl.[7] .................................................. F01D 5/18
(52) U.S. Cl. .............................. 415/12; 415/47; 415/49; 416/39; 416/96 A
(58) Field of Search .............................. 415/12, 47, 49, 415/115, 116; 416/39, 96 R, 96 A, 97 R

(56) References Cited

U.S. PATENT DOCUMENTS

| | | | |
|---|---|---|---|
| 2,906,494 A | * | 9/1959 | McCarty et al. .......... 416/96 R |
| 2,977,089 A | * | 3/1961 | McCarty et al. .......... 416/96 R |
| 2,977,090 A | * | 3/1961 | McCarty et al. .......... 416/96 R |
| 3,575,528 A | * | 4/1971 | Beam, Jr. et al. ............. 416/39 |
| 4,740,138 A | | 4/1988 | Zaehring |
| 4,859,141 A | | 8/1989 | Maisch |
| 5,022,817 A | | 6/1991 | O'Halloran |
| 5,403,156 A | * | 4/1995 | Arness et al. ............. 416/96 R |

FOREIGN PATENT DOCUMENTS

| | | |
|---|---|---|
| GB | 2 015 085 A | 9/1979 |
| GB | 2 022 710 A | 12/1979 |
| JP | 040292712 AB | 10/1992 |
| JP | 080254128 AB | 10/1996 |

* cited by examiner

*Primary Examiner*—Edward K. Look
*Assistant Examiner*—Richard A. Edgar
(74) *Attorney, Agent, or Firm*—Warren Taltavull; Manelli Denison & Selter PLLC

(57) ABSTRACT

A cooling air flow control device for a gas turbine engine, the cooling air flow control device comprising a component, a cooling passage defined within the component and a shaped memory metal valve, the shaped memory metal valve disposed in the cooling passage to regulate, in use, the flow rate of a cooling air flow supplied, in operation, through the cooling passage wherein the shaped memory metal valve operates by changing shape to control the flow rate of the cooling air flow in response to the temperature of the component.

14 Claims, 6 Drawing Sheets

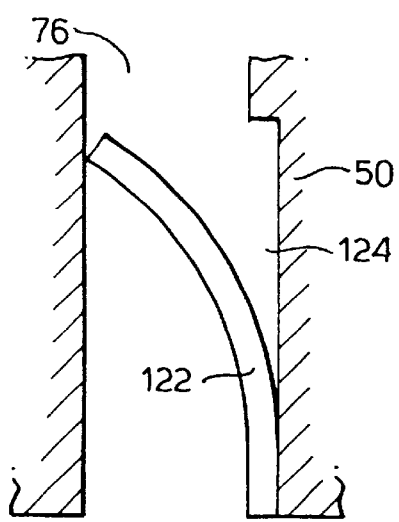
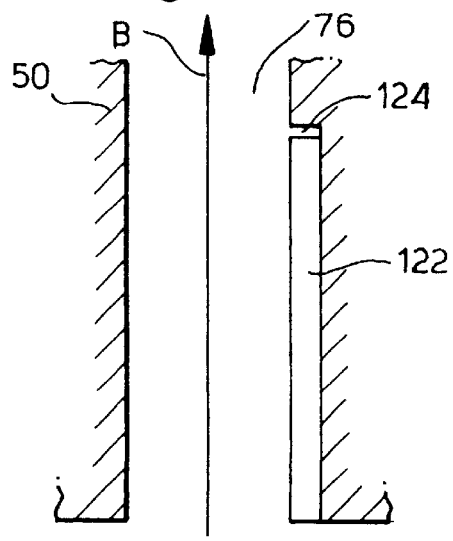
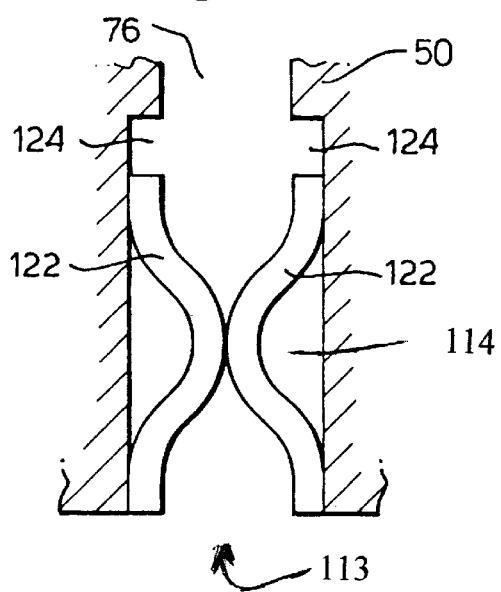
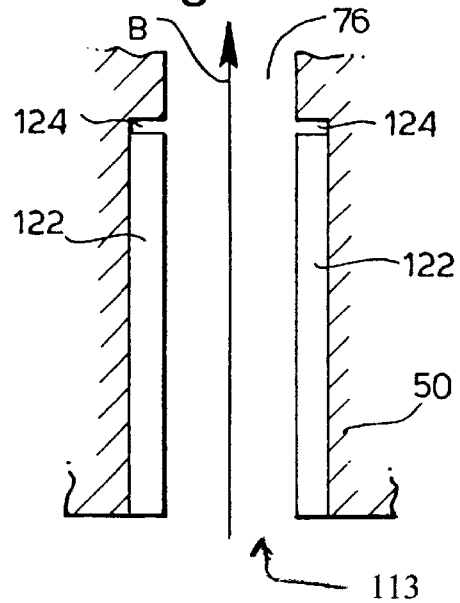
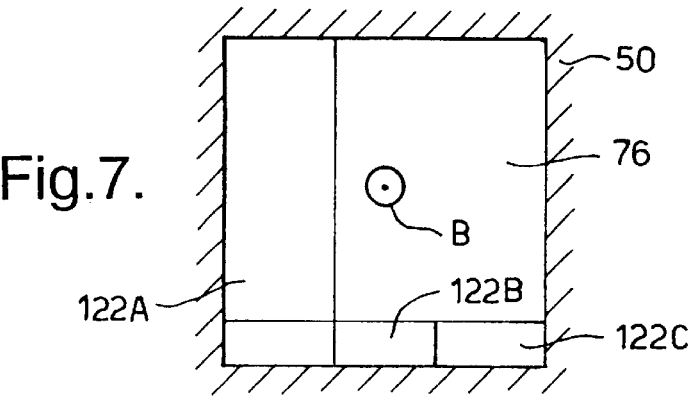

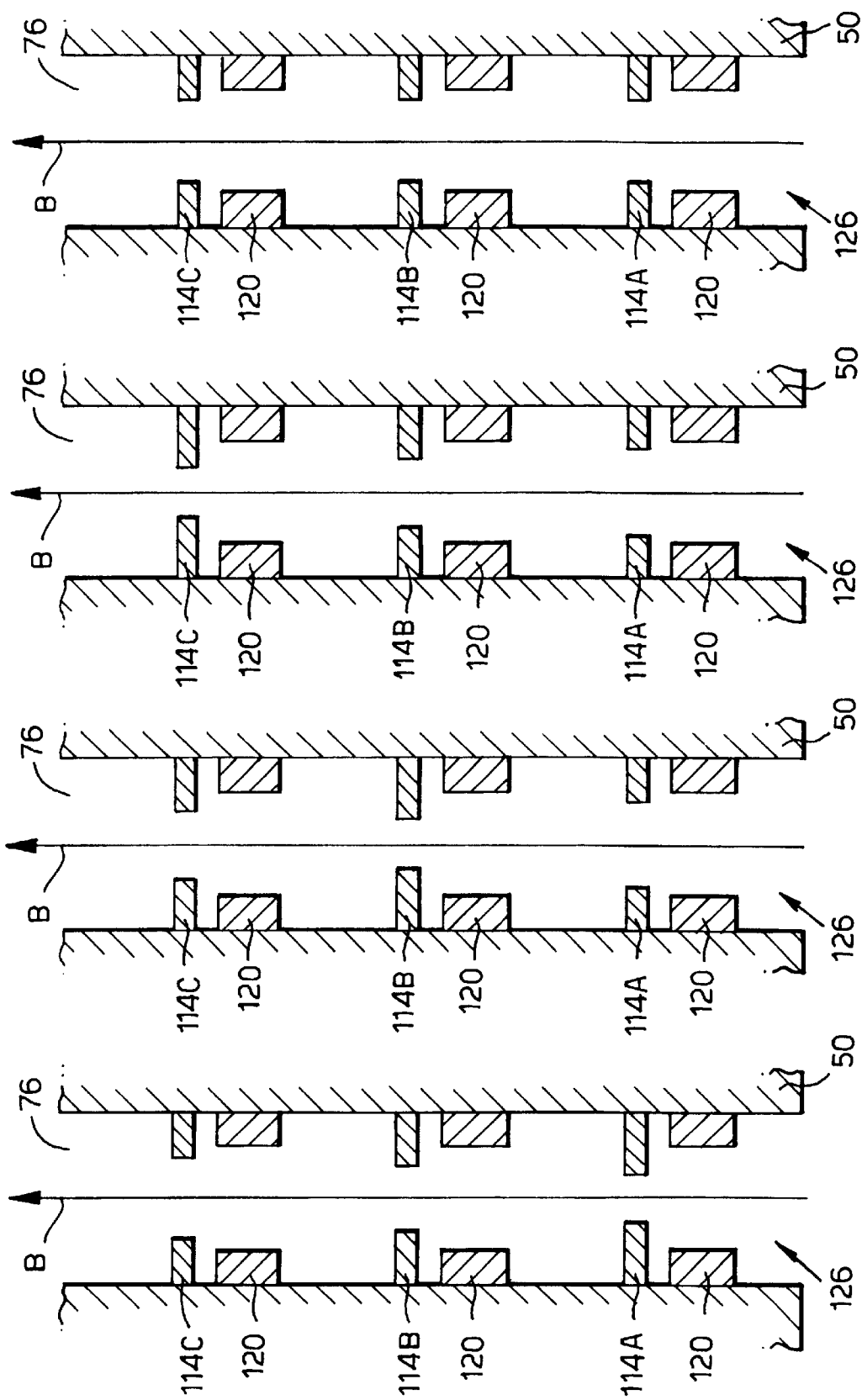

COOLING AIR FLOW CONTROL DEVICE FOR A GAS TURBINE ENGINE

FIELD OF THE INVENTION

The present invention relates to a gas turbine engine and is particularly concerned with a gas turbine engine that includes a cooling air flow control device which is particularly associated with the regulation of a cooling air flow for turbine components.

BACKGROUND OF THE INVENTION

During a flight cycle of an aircraft a gas turbine engine is required to provide varied performance (e.g. takeoff and cruise) and its turbine stage, subject to a jet of hot gases, undergoes a range of operating temperatures. To control the component temperature, air is bled from a compressor stage to the turbine stage to maintain an even turbine temperature. Ducting air from the compressor reduces engine inefficiency and it is therefore desirable to minimize this bleeding whenever and wherever possible.

Conventional regulation means for cooling air flow is disclosed in GB2015085A wherein a cooling air control valve, remote from a component to be cooled, is closed at engine cruise conditions when an equilibrium of pressure exists either side of a diaphragm. An infra-red pyrometer detects turbine temperature change for engine conditions above cruise and sends a signal to an electro-magnetically operated pressure control valve releasing pressure from one side of the diaphragm thereby opening the cooling air control valve, increasing the cooling air flow above cruise air flow to the turbine stage.

The use of shaped memory metal (hereinafter termed SMM) components for controlling the fluid flow in a carburettor nozzle of an internal combustion engine is disclosed in GB2022710. A sleeve of SMM responds by changing the cross-sectional flow area according to the temperature of the fluid. The sleeve is relatively long in order to respond to the temperature of the fluid. In another embodiment of the invention, disclosed in GB2022710, a spring of SMM, located in the flow of fluid through the carburettor, controls the position of a needle relative to a seat thereby regulating the fluid flow.

It is important that turbine components, such as turbine blades, are cooled sufficiently for them to operate in extremely hot conditions and sometimes high centrifugal fields. Thermal cycling reduces the life of components so a constant temperature is beneficial. Allied to this, a constant component temperature is preferable in order to control thermal expansions and thus component to component clearances. The ability of the cooling system to reduce unnecessary compressor bleed and to minimise the response time of the system enhances engine efficiency and longevity of the engine components.

SUMMARY OF THE INVENTION

It is an object of the present invention to provide a cooling air flow control system for a gas turbine engine which maintains a constant temperature of an engine component, is rapid to respond throughout the operating conditions of the engine and promotes fuel efficiency of the engine.

According to the present invention there is provided a cooling air flow control device for a gas turbine engine, the cooling air flow control device comprising a component, a cooling passage defined within the component, a shaped memory metal valve, the shaped memory metal valve disposed in the cooling passage to regulate, in use, the flow rate of a cooling air flow supplied, in operation, through the cooling passage wherein the shaped memory metal valve operates by changing shape to control the flow rate of the cooling air flow in response to the temperature of the component.

Preferably the shaped memory metal valve comprises a body portion defining an orifice, the cooling air flow, in use, passing through the orifice.

Preferably the shaped memory metal valve comprises a shaped memory metal which is of washer-like shape.

Alternatively the shaped memory metal valve comprises a plate of shaped memory metal.

Alternatively the shaped memory metal valve comprises a plate of shaped memory metal, the plate is of generally arcuate shape.

Preferably the cooling air flow control device comprises the shaped memory metal valve arranged to operate by distorting substantially out of a principal plane of the shaped memory metal valve.

Alternatively the cooling air flow control device comprises the shaped memory metal valve arranged to operate by transforming shape substantially in a principal plane of the shaped memory metal valve when subjected to a predetermined temperature change.

Preferably the cooling air flow control device comprises the shaped memory metal valve arranged to operate by distorting substantially out of a principal plane of the shaped memory metal valve in the direction of the cooling air flow.

Alternatively the cooling air flow control device comprises a plurality of shaped memory metal valves which are disposed in the cooling passage.

Preferably the cooling air flow control device comprises a land, the land disposed in juxtaposition to the shaped memory metal valve.

Preferably the land is disposed upstream, relative to the cooling air flow, in juxtaposition to the shaped memory metal valve.

Preferably the component comprises a turbine blade.

Alternatively the component comprises a turbine vane, a turbine disc, an engine casing, a bearing chamber or an air heat exchanger.

Preferably the shaped memory metal valve changes, in operation, from a first shape to a second shape at a specific temperature.

Alternatively the shaped memory metal valve changes, in operation, progressively from a first shape to a second shape throughout a predetermined temperature range.

BRIEF DESCRIPTION OF THE DRAWINGS

A specific embodiment of the invention will now be described by way of example with reference to the accompanying drawing in which:

FIGS. 5A–B are enlarged views of part of a second embodiment of the present invention and illustrate the operation of the second embodiment.

FIGS. 6A–B are enlarged views of part of a third embodiment of the present invention and illustrate the operation of the third embodiment.

FIG. 7 is an enlargement view of part of a fourth embodiment of the present invention and illustrates the operation of the fourth embodiment.

FIGS. 8A–D are enlarged views of part of a fourth embodiment of the present invention and illustrate the operation of the fifth embodiment.

DETAILED DESCRIPTION OF THE INVENTION

Figure 1:
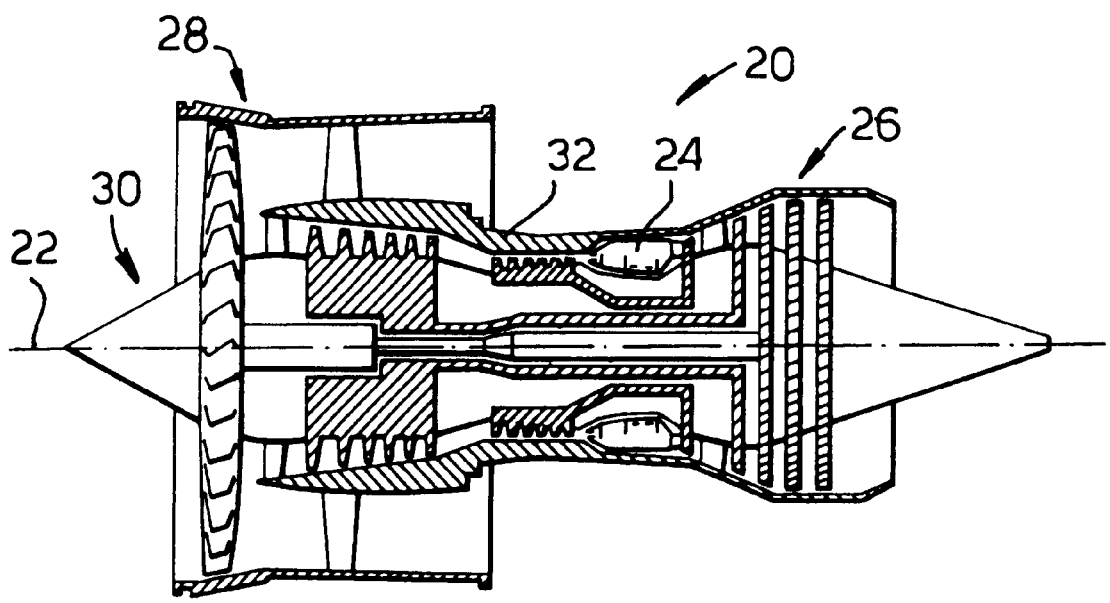
FIG. 1 is a schematic axial cross section side view of a gas turbine engine in accordance with the present invention.

Referring to FIG. 1, a gas turbine engine 20 of known general configuration and method of operation, comprises a rotational axis 22 of the engine 20, a combustor 24 and a turbine 26 and a compressor stage 28. The combustor 24 expels a jet of hot exhaust gases which impinges on the turbine 26 and in consequence the turbine 26 drives the compressor stage 28 which comprises a propulsive fan assembly 30. The turbine 26 is enclosed by an engine casing 32 and is required to operate at high temperatures. It is efficient to cool the turbine 26 with a cooling air flow bled from the compressor stage 28. However, this bleed reduces the overall efficiency of the engine 20 and it is therefore necessary to reduce the cooling air flow bleed whenever and wherever possible.

Figure 2:
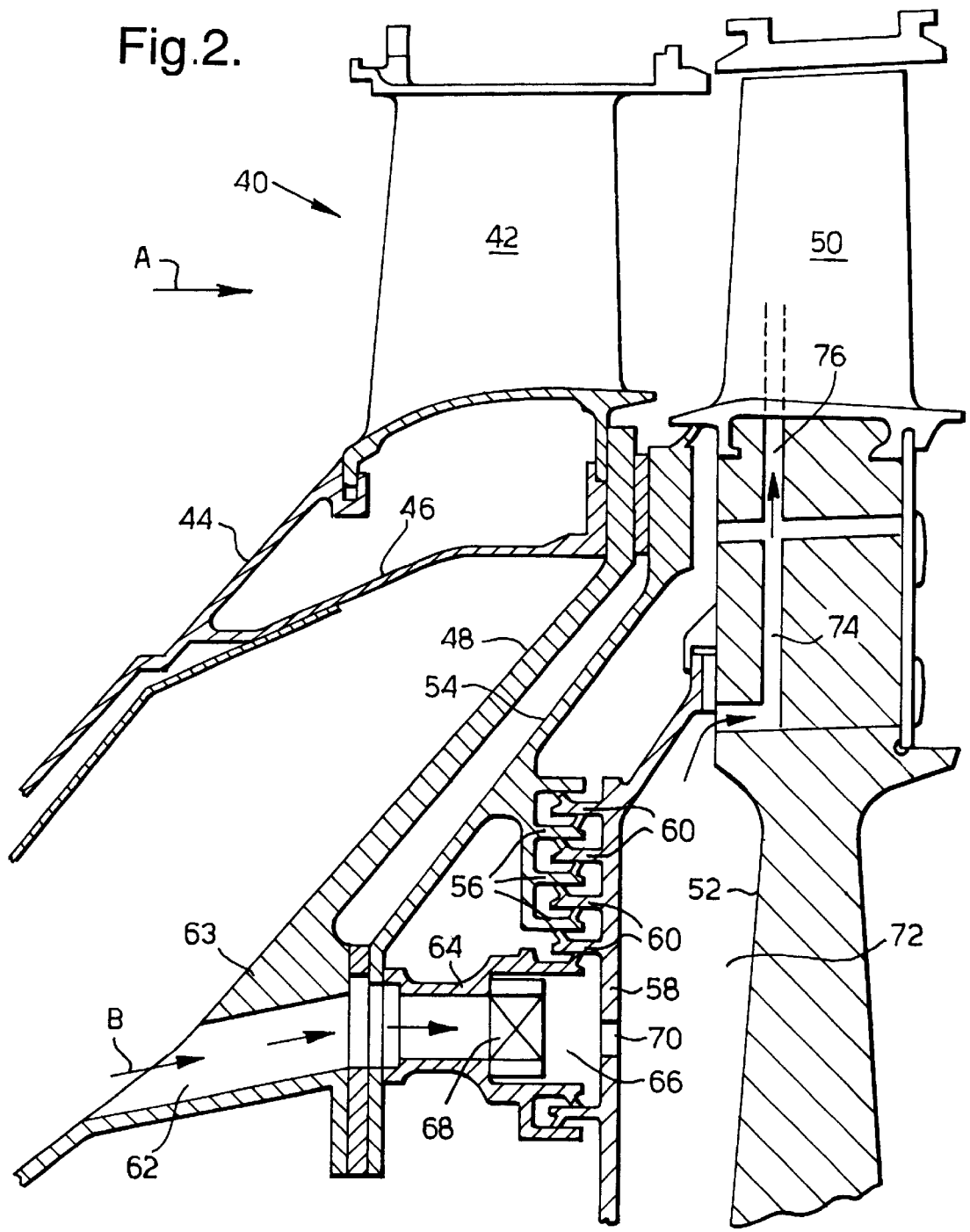
FIG. 2 is a cross sectional part view of a turbine of a gas turbine engine incorporating an embodiment of the present invention.

With reference to FIG. 2, a turbine stage 40 of the turbine 26 of the gas turbine engine 20 (FIG. 1) includes a stage of nozzle guide vanes 42 which is fixed between the engine casing 32 (FIG. 1) and frusto conical members 44, 46 and 48. A rotatable stage of turbine blades 50, mounted on a turbine disc 52 is positioned immediately downstream of the stage of nozzle guide vanes 42.

A frusto conical member 54 has a number of annular lands 56 on its downstream face i.e., downstream with respect to the direction of flow of exhaust gases A through the gas turbine engine 20. A blank disc 58 is affixed to the turbine disc 52 for co-rotation therewith and has corresponding lands 60 on its upstream face, which co-operate with the lands 56 to control a cooling air flow B leakage therethrough, in known manner.

The cooling air flow B is directed, in operation, via a primary passage 62 in an annular central portion 63 of the frusto conical member 48, to a space 66, defined by a swirl device housing 64 and the upstream face of the blank disc 58. The cooling air flow B passes through a swirl device 68 prior to entering the space 66. The swirl device 68 ensures that the cooling air flow B enters the space 66 in the direction of rotation of the blank disc 58, thus avoiding friction therebetween, and consequently heating of the air.

The cooling air flow is directed through an annular array of orifices 70 in the blank disc 58 from the space 66 into expanse 72, defined by the downstream face of the blank disc 58 and the upstream face of the turbine disc 52, and subsequently through a cooling passage 74 in the turbine disc 52 to feed into a passage 76 in the turbine blade 50.

Figure 3:
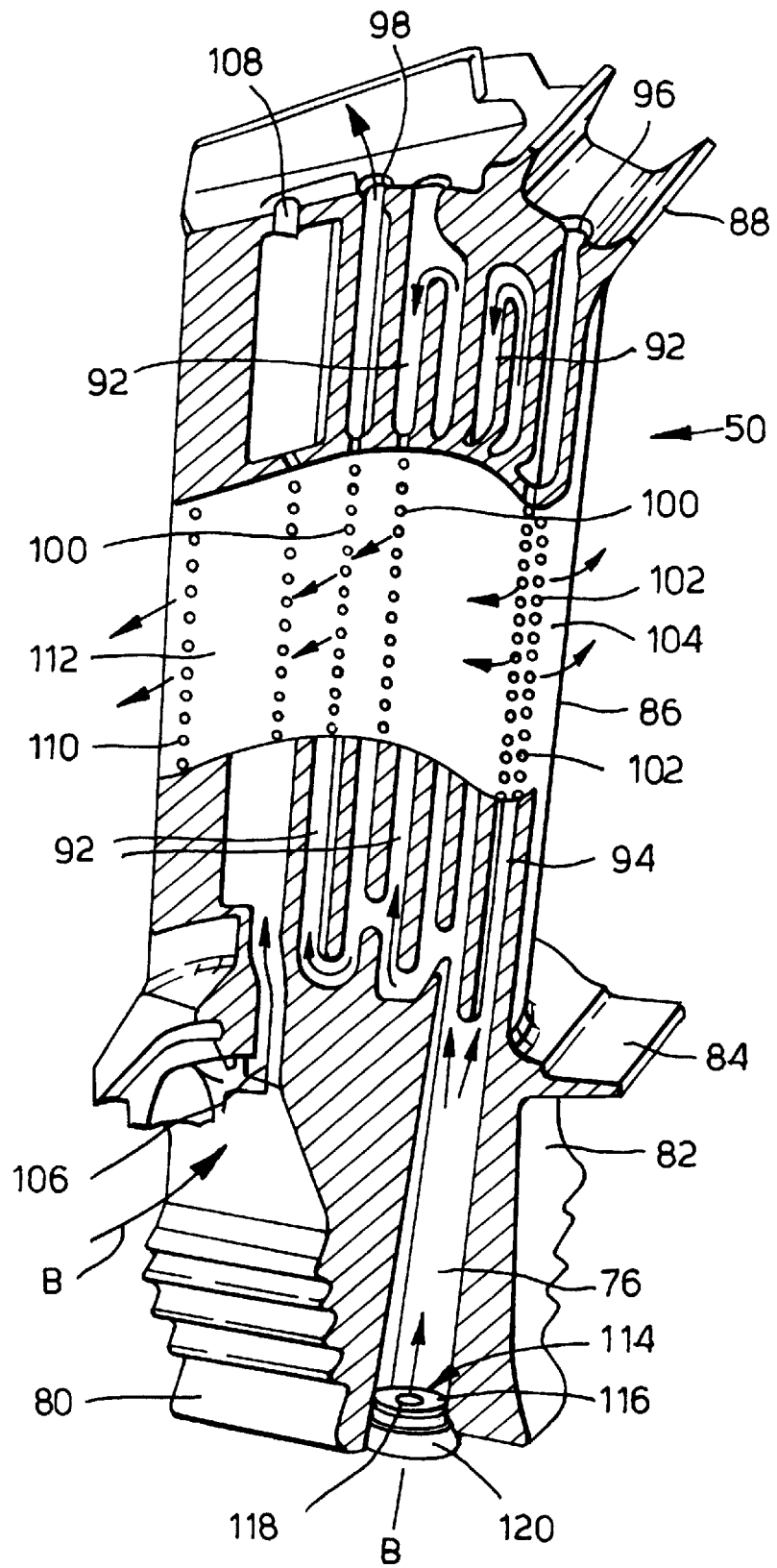
FIG. 3 is a diagrammatic arrangement of the whole of the embodiment of present invention shown in FIG. 2.

With reference to FIG. 3, a turbine component 50, in this embodiment a turbine blade 50, comprises a root 80, a shank 82, a platform 84, an aerofoil portion 86 and a shrouded tip 88. The shrouded tip 88 and platform 84 co-operate with the shrouded tips 88 and platforms 84 of circumferentially adjacent turbine blades 50 to define an axial portion of the gas passage which contains the aerofoil portions 86. The root 80 is interconnected with the remainder of the blade 50 by means of the shank 82. The root portion 80 is of the conventional "fir-tree" configuration, as known in the art, to facilitate its attachment to the rim of the turbine disc 52 (FIG. 2).

The passage 76 provides entry for the cooling air flow B into the turbine blade 50. The cooling air flow B branches into internal passages 92, 94. The cooling air flow B exits the turbine blade 50 through main orifices 96 and 98 in the shrouded tip 88 and a number of subsidiary orifices 100, in the body of the aerofoil portion 86, and subsidiary orifices 102 in a leading edge 104 of the aerofoil portion 86 thereby providing a film of cooling air over the aerofoil portion 86 surface. Further cooling air may be directed into the turbine blade 50 via an inlet 106 and exited through a main orifice 108 and subsidiary orifices 110 in a trailing edge 112 of the aerofoil portion 86.

The present invention is particularly concerned with the regulation of cooling air flow B into the passage 76 of the turbine blade 50. Continuing to refer to FIG. 3, a cooling air flow control device 113 comprises a shaped memory metal valve 114 disposed in the passage 76 of the turbine component 50. The SMM valve 114 comprises a body portion 116 defining a cooling air flow orifice 118, the cooling air flow B, in use, passing through the orifice 118. It is preferred to dispose the SMM valve 114 to the passage 76 after the manufacture of the blade 50, however, the SMM valve 114 may be also either cast into the blade 50 during manufacture of the blade 50 or be cast as an integral part of the blade 50.

The SMM valve 114 is designed and manufactured to increase the area of the cooling air flow orifice 118 in response to an increase in temperature of the component 50 thereby increasing the amount of the cooling air flow through the passage 76. As the component 50 reduces in temperature the SMM valve 114 accordingly reduces the area of the cooling air flow orifice 118 thereby reducing cooling air flow bleed from the compressor stage 28 (FIG. 1) when cooling air flow is not required.

The SMM valve 114 is required to respond to the temperature of the blade 50 but is also subject to cooling by the cooling air flow B. To reduce the cooling effect a land 120 is positioned upstream of the SMM valve 114, relative to the direction of the cooling air flow B, which provides shielding from the cooling air flow B.

Figure 4A:
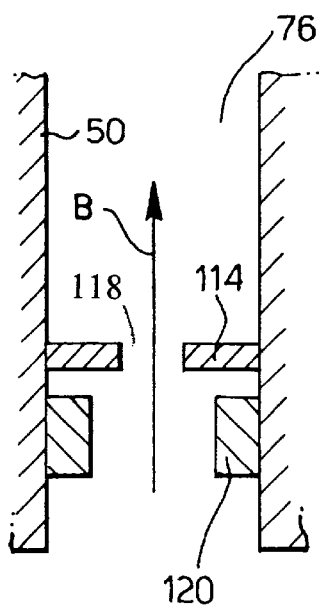
FIGS. 4A–D are enlarged views of part of the embodiment of the present invention and illustrate the operation of the present invention.
Figure 4B:
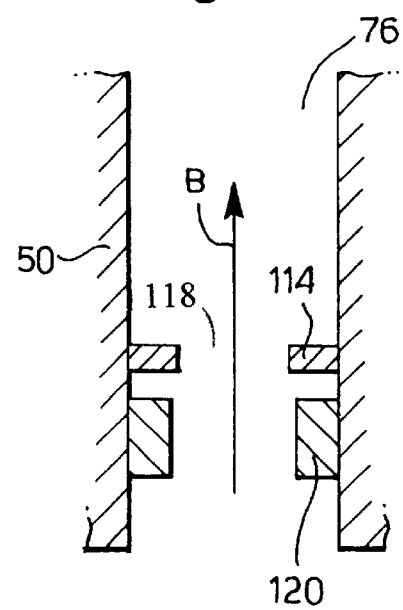
Figure 4C:
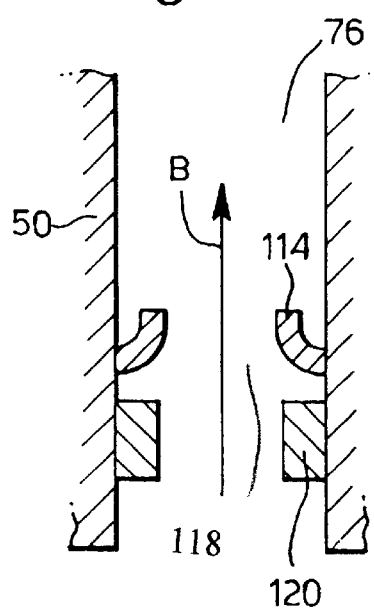

FIGS. 4A, 4B and 4C schematically show how the SMM valve 114 of the cooling air flow control device 113 operates. In FIG. 4A the turbine blade 50 is cool and the SMM valve 114 restricts the cooling air flow B accordingly with a relatively narrow cooling air flow orifice 118. In FIGS. 4B and 4C the turbine blade 50 has increased in temperature thereby increasing the temperature of the SMM valve 114. In response to the turbine blade 50 increasing in temperature the SMM valve 114 operates by dilating, in the principal plane of the SMM valve 114, (FIG. 4B) or distorting substantially out of the principal plane of the SMM valve 114 (FIG. 4C) to widen the orifice 118, thereby increasing the cooling air flow B to the turbine blade 50.

It is a desired advantage for the SMM valve 114 to distort substantially at of the principal plane of the SMM valve 114 in the downstream direction rather than the upstream direction as shown on FIG. 4C. This will allow the land 120 to be located nearer to the SMM valve 114 and in this way the temperature of the SMM valve 114 is more representative of the temperature of the turbine component 50. Distortion of the SMM valve 114 in a downstream, out of plane direction also provides a better aerodynamic shape for the cooling airflow B.

Figure 4D:
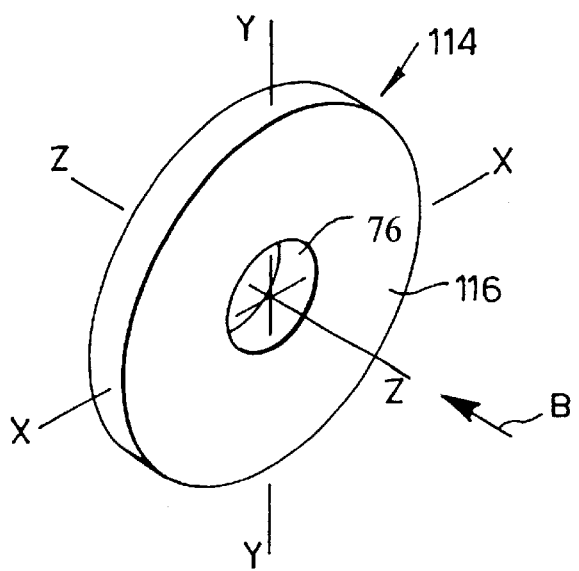

FIG. 4D defines the principal plane XY of the SMM valve 114 as the plane passing through the two mutually perpendicular axes, XX and YY, as shown. The principal plane of SMM valve 114 is arranged substantially perpendicular to the direction, along the ZZ axis, of the cooling air flow B in the passage 76, which flows in the general direction of along the ZZ axis.

The preferred SMM valve 114 for this embodiment of the present invention is commercially known as a "Belco (TM) washer" and is available from Shape Memory Applications Inc., 2380 Owen Street, Santa Clara, Calif. 95054. The SMM valve 114 may be manufactured from any, or any combination of the following materials; Titanium, Manganese, Iron, Aluminium, Silicon, Nickel, Copper, Zinc, Silver, Cadmium, Indium, Tin, Lead, Thallium, Platinum.

Other embodiments of the present invention described hereinafter describe configurations of the SMM valve 114, of the cooling air flow device 113, which perform the aforementioned regulation of the flow rate of the cooling air flow.

FIGS. 5A and 5B show a second embodiment of the present invention. In this second embodiment of the cooling air flow device 113, the SMM valve 114 comprises a plate 122 of shaped memory metal disposed in the passage 76 of the turbine blade 50. The passage 76 comprises a recess 124, defined by the component 50, of substantially similar depth to the thickness of the plate 122. The plate 122, disposed in the passage 76, is designed to bend from a first arcuate shape (FIG. 5A), substantially blocking the cooling air flow B, when the component 50 is relatively cool, to a second substantially flat shape (FIG. 5B), generally aligning itself in the recess 124, in response to an increase in the temperature of the component 50. The operation of the plate 122 is reversible in that as the turbine blade 50 reduces in temperature the flat plate 122 (FIG. 5B) returns to the first arcuate shape (FIG. 5A) thereby blocking the passage 76.

FIGS. 6A and 6B show a third embodiment of the present invention. In this third embodiment of the cooling air flow device 113, the SMM valve 114 comprises a plate 122 of shaped memory metal disposed in the passage 76 of the turbine blade 50. The passage 76 comprises a recess 124, defined by the component 50, of substantially similar depth to the thickness of the plate 122. The plate 122, disposed in the passage 76, is designed to bend from a first generally "C" shape (FIG. 6A), substantially blocking the cooling air flow B, when the component 50 is relatively cool, to a second substantially flat shape (FIG. 6B), generally aligning itself in the recess, in response to an increase in the temperature of the component 50. The operation of the SMM valve 114 is reversible in that as the component 50 reduces in temperature the flat plate 122 (FIG. 6B) returns to the arcuate shape (FIG. 6A) thereby blocking the passage 76. This embodiment is particularly suited to having two shaped memory metal plates 122 located opposite each other in recesses 124 in the passage 76 as shown in FIGS. 6A and 6B. By the nature of the arcuate shape of the plate 122, when the turbine blade 50 is relatively cool, there is always provide a contact therebetween, thus substantially blocking the cooling air flow B.

A fourth embodiment of the present invention is shown on FIG. 7, which is a view of the passage 76 in the direction of the cooling air flow B (FIG. 3). The SMM valve 114 comprises a number of plates 122 of shaped memory metal disposed substantially parallel to one another in the passage 76 of the turbine blade 50. The passage 76 comprises a recess 124, defined by the turbine blade 50, of substantially similar depth to the thickness of the plate 122. The plates 122A, 122B and 122C, disposed in the recess 124, are designed to straighten from a first arcuate shape (similar to FIG. 5A), substantially blocking the cooling air flow B, when the component 50 is relatively cool, to a second substantially flat shape (similar to FIG. 5B), generally aligning itself in the recess 124, in response to an increase in the temperature of the component 50. Each of the plates 122A, 122B and 122C, constituting the SMM valve 114 are sensitive to different temperatures or temperature ranges, switching from the first arcuate shape, blocking the passage 76, to a substantially flat shape, aligned in the recess and allowing the cooling air flow B through the passage 76.

In a fifth embodiment of the present invention a plurality of SMM valves 126 may be disposed in series in the passage 76. In this fifth embodiment of the cooling air flow device 113, the plurality of SMM valves 126 operate as shown in FIGS. 8A to 8D. Any of the aforementioned embodiments of the SMM valve 114 may be used, for regulation of the flow rate of the cooling air flow B, in this fifth embodiment although for simplicity and in this embodiment a SMM valve 114 which dilates substantially in the principal plane of the SMM valve 114 is used. Furthermore, for this embodiment, each of the SMM valves 114 are designed to switch at a specific temperature. FIG. 8A shows the plurality of SMM valves 126 disposed in the passage 76 of a relatively cool, about 700° C., turbine blade 50. It is preferred that the orifice 118 of each SMM valve 114 in downstream order, SMM valves 114A, 114B and 114C, of the cooling air flow B, is wider than its upstream neighbour as the upstream SMM valve 114 therefore controls the cooling air flow B. FIG. 8B, shows the turbine blade 50 at about 800° C. when the SMM valve 114A switches shape, increasing its cooling air flow orifice 118 area to increase the cooling air flow B through the passage 76. FIG. 8C, shows the turbine blade 50 at about 1000° C. when the SMM valve 114B switches shape, increasing the area of its cooling air flow orifice 118. FIG. 8D, shows the turbine blade 50 at about 1200° C. when the SMM valve 114C switches shape, increasing its cooling air flow orifice 118 area. The operation of the plurality of SMM valves 126 is reversible as the temperature of the turbine blade 50 reduces.

Although the SMM valve 114 may be disposed in any of the passages 76, 92, 94 or any combination of passages 76, 92, 94 in the turbine blade 50. Similarly, other embodiments of the present invention include disposing the SMM valve 114 to some or all of the orifices 96, 98, 100, 102, 108, 110 or inlet 106. Disposing a SMM valve 114 to all exit orifices 96, 98, 100, 102, 108, 110 would give the optimum embodiment of the present invention for cooling the turbine blade 50. In this optimum embodiment, localised hot regions of the turbine blade 50 are controlled on a local level thereby minimising the cooling air flow bleed.

Moreover, although the present invention has been described with reference to cooling of turbine blades 50 any engine component, e.g. an engine casing 32, a nozzle guide vane 42, a frustro conical member 44, 46, 48, 54, a turbine disc 52, a blank disc 58, a bearing chamber (not shown) as known in the art and a heat exchanger (not shown) as known in the art may be cooled in a similar manner.

All the embodiments described herein may be employed with the SMM valve 114 designed and manufactured to either "switch" from a first shape at a first temperature to second shape at a second temperature or to gradually change shape over a temperature range from a first shape at a first temperature to second shape at a second temperature. The shape of the SMM valve 114 and temperature at which the SMM valve 114 changes shape are predetermined. The SMM valve 114 is designed to be fail-safe, a fracture of the SMM valve 114 leads to an increased orifice 118 flow area, thereby supplying at least the necessary amount of cooling air flow.

Although the SMM valve 114 is designed to increase the flow area of the cooling air flow orifice 118 in response to an increase in its temperature the SMM valve 114 may be designed to decrease the flow area of the cooling air flow orifice 118 in response to a decrease in its temperature if so desired.

We claim:

1. A cooling air flow control device for a gas turbine engine, the cooling airflow control device comprising a component, a cooling passage defined within the component and a shaped memory metal valve, the shaped memory metal valve disposed in a cooling passage to regulate, in use, the flow rate of a cooling airflow supplied, in operation, through the cooling passage wherein the shaped memory metal valve operates by changing shape to control the flow rate of the cooling airflow in response to the temperature of the component, the shaped memory metal valve comprising a shaped memory metal valve which is of more sure-like shape.

2. A cooling air flow control device for a gas turbine engine as claimed in claim 1 wherein the shaped memory metal valve comprises a body portion, the body portion defining an orifice, the cooling air flow, in use, passing through the orifice.

3. A cooling air flow control device for a gas turbine engine as claimed in claim 1 wherein the shaped memory metal valve comprises a plate of shaped memory metal.

4. A cooling air flow control device for a gas turbine engine as claimed in claim 3 wherein the shaped memory metal valve comprises a plate of shaped memory metal, the plate is of generally arcuate shape.

5. A cooling air flow control device for a gas turbine engine as claimed in claim 1 wherein the cooling air flow control device comprises the shaped memory metal valve arranged to operate by distorting substantially out of a principal plane of the shaped memory metal valve.

6. A cooling air flow control device for a gas turbine engine as claimed in claim 1 wherein the cooling air flow control device comprises the shaped memory metal valve arranged to operate by distorting substantially out of a principal plane of the shaped memory metal valve in the direction of the cooling air flow.

7. A cooling air flow control device for a gas turbine engine as claimed in claim 1 wherein the cooling air flow control device comprises a plurality of shaped memory metal valves disposed in the cooling passage.

8. A cooling air flow control device for a gas turbine engine as claimed in claim 1 wherein the cooling air flow control device comprises a land, the land disposed in juxtaposition to the shaped memory metal valve.

9. A cooling air flow control device for a gas turbine engine as claimed in claim 8 wherein the land is disposed upstream, relative to the cooling air flow, in juxtaposition to the shaped memory metal valve.

10. A cooling air flow control system for a gas turbine engine as claimed in claim 1 wherein the component comprises a turbine blade.

11. A cooling air flow control system for a gas turbine engine as claimed in claim 1 wherein the component comprises a turbine vane, a turbine disc, an engine casing, a bearing chamber or an air heat exchanger.

12. A cooling air flow control device for a gas turbine engine as claimed in claim 1 wherein the shaped memory metal valve changes, in operation, from a first shape to a second shape at a specific temperature.

13. A cooling air flow control device for a gas turbine engine as claimed in claim 1 wherein the shaped memory metal valve changes, in operation, progressively from a first shape to a second shape throughout a predetermined temperature range.

14. A cooling air flow control device for a gas turbine engine, the cooling airflow control device comprising a component, a cooling passage defined within the component and a shaped memory metal valve, the shaped memory metal valve disposed in a cooling passage to regulate, in use, the flow rate of a cooling airflow supplied, in operation, through the cooling passage wherein the shaped memory metal valve operates by changing shape to control the flow rate of the cooling airflow in response to the temperature of the component the cooling airflow control device comprising the shaped memory metal valve arranged to operate by transforming shape substantially in a principal plane of the shaped memory metal valve when subjected to a predetermined temperature change.

* * * * *